Aug. 28, 1934.    E. A. STALKER    1,971,734
AIRCRAFT SUSTAINED BY A LIFTING SCREW
Filed May 16, 1931    2 Sheets-Sheet 1

Inventor
Edward A. Stalker

Inventor
Edward A. Stalker

Patented Aug. 28, 1934

1,971,734

UNITED STATES PATENT OFFICE 1,971,734

AIRCRAFT SUSTAINED BY A LIFTING SCREW

Edward A. Stalker, Ann Arbor, Mich.

Application May 16, 1931, Serial No. 537,809

3 Claims. (Cl. 244—19)

My invention relates to improvements in aircraft supported directly by lifting airscrews. The objects of my invention are, first, to provide a new arrangement of the airscrew, passengers, motor, and antitorque mechanism to provide a greater over-all efficiency; secondly, to provide a means of maneuvering the aircraft on the ground; thirdly, to provide a new means of removing the boundary layer from the blades; fourthly, to provide a means by which the antitorque mechanism can be used for propulsion.

Figure 1:
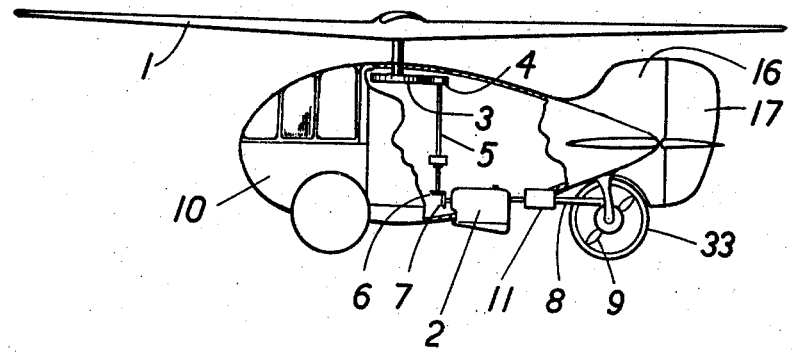
Figure 2:
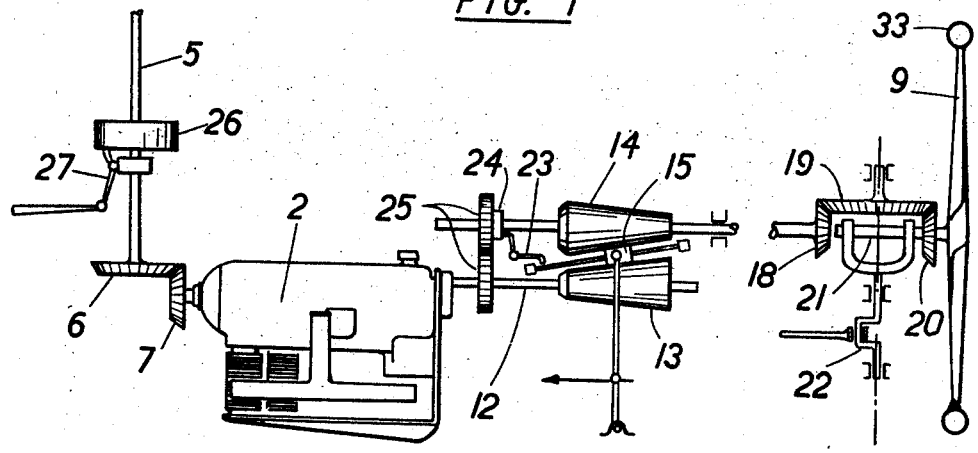
Figure 3:
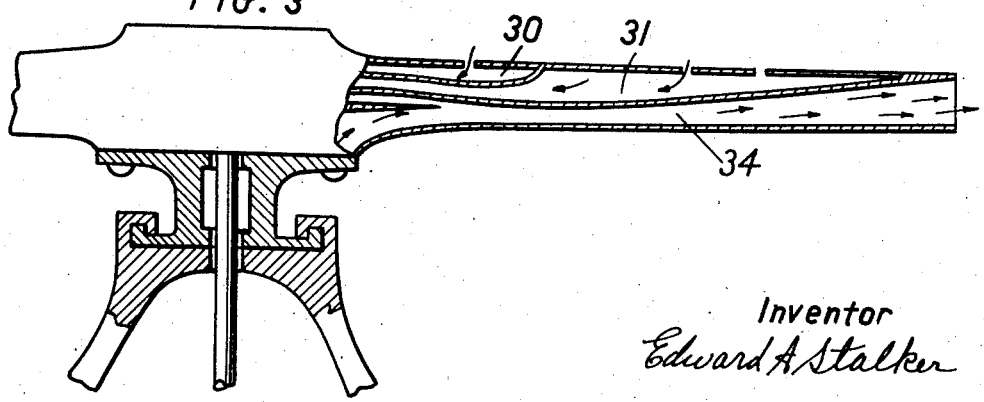
Figure 4:
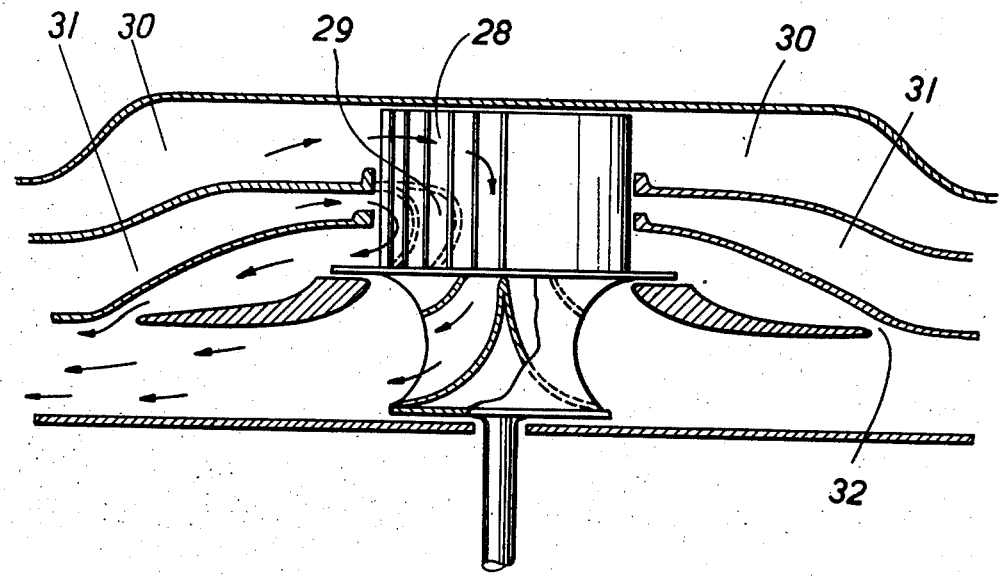
Figure 5:
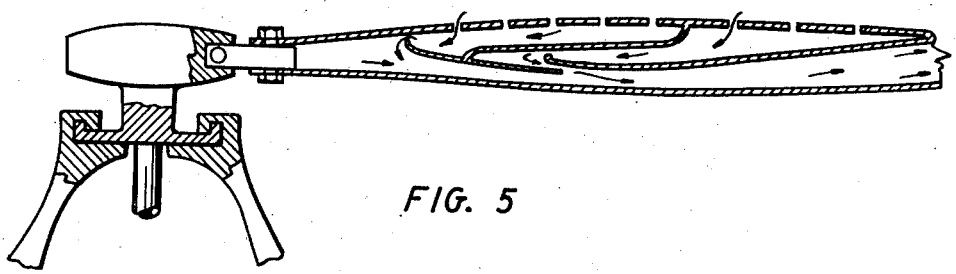

I attain these objects by the mechanisms illustrated in the accompanying drawings in which Figure 1 is a side view of the machine; Figure 2 is a diagram of the mechanism; Figure 3 is a vertical section through the airscrew; Figure 4 is a section through the airscrew hub; and Figure 5 is another vertical section through a varied form of the airscrew.

Similar numerals refer to similar parts throughout the several views.

In Figure 1 the lifting screw is indicated as 1. It is driven by the motor 2 through the gears 3 and 4, the shaft 5, and the bevel gears 6 and 7. The motor also drives the shaft 8 which actuates the airscrew 9.

In driving the lifting screw the motor tends to turn the body 10 in the opposite direction. This torque may be counteracted by driving the airscrew 9 so as to generate a counter torque. To provide for all conditions of torque, a mechanism for varying the speed of rotation of 9 is provided at 11. It is shown diagrammatically in Figure 2. In this figure the shaft 12 actuates the cone 13 which drives a similar cone 14 through the idler 15. Means are to be provided to shift the idler fore and aft thus accomplishing a change in the rate of rotation of 9 at a given engine speed.

The airscrew 9 is only necessary for short periods of time, such as during take-off and landing. At other times the craft has enough forward speed to provide a counter torque through the fin 16 and rudder 17.

It is then desirable to use the airscrew 9 for propulsion for which purpose the screw may be turned through 90° into the position shown in Figure 2. The turning is permitted by the bevel gears 18, 19, and 20. The gear 20 is carried on the propeller shaft 21 by the rotatable support 22.

The airscrew 9 also carries a tire 33 at its periphery and serves as a tail wheel through which the aircraft may be driven and directed on the ground.

Provision is made for reversing the direction of rotation of 9 for maneuvering on the ground. When the idler 15 is pulled forward the speed ratio is reduced, until finally the idler makes no contact with 13 and 14 due to the chamfering of these members. If pushed still further forward it operates the crank 23 which operates the clutch 24. Thus the direction of the cone 14 is reversed through the gear train 25. The wing or blade 36 is hinged to the hub 37 by vertical and horizontal pins 38 and 39. Oscillation about the horizontal pin permits the blade to rise when advancing and to fall when retreating. By this action the true angles of attack are altered so that the lift increases on the down travelling blade and decreases on the up travelling blade. This is a well known means of balancing an airscrew travelling parallel to its plane of rotation. The amount of oscillation required for balance depends on the ratio between the speed of advance and the rate of rotation. The greater the rate of rotation the higher the forward speed permissible without flapping which may injure the structure.

A structure 40 supports the airscrew hub 41 so that it may rotate freely.

A clutch is also provided at 26 to cut off the main lifting screw from the motor. It is actuated through the crank 27.

When the lifting airscrew is rotating and the aircraft is moving forward, the advancing blade has more lift than the retreating blade. This condition can be met by the methods set forth in my patent application Serial Number 524,550 filed March 23, 1931. In this machine the source of pumping is the blades themselves. Due to their rotation, the air in the interior of the blades is thrown out the open tips of the blades, Figure 3. The pumping thus provided is communicated to the hub chambers 28 and 29. The chamber 28 is in communication with a compartment 30 near the root of the blades while 29 is in communication with a compartment 31 running to the tips of the blades. The tip compartment needs a greater suction pressure to remove the boundary layer than the centrifugal pressure will provide. By providing the passage in the blades of Venturi form a high suction pressure may be obtained at the throat. This is shown best in Figure 4. An opening 32 into the throat connects it to the tip compartment 31 through the chamber 29. The mouth of the venturi connects with the chamber 28 and draws air from the inner compartment. Balance and control are then achieved as in the patent application dated above.

Removing the boundary layer from the blades has the effect of speeding up their rate of rotation.

It will be advantageous therefore to remove the boundary layer even where the balance is obtained by hinging the blades as in Figure 5. The mode of operation is apparent from the description above and Figure 5.

The motor is located at the bottom of the fuselage so that the cylinders protrude through the fuselage surface. The location is particularly advantageous for in the event of a crash even at a very large diving angle the motor is not thrown into the passenger compartment. Excellent vision is also provided the location of the motor out of the forward hemisphere of vision.

I claim:

1. In an aircraft sustained by a lifting airscrew, passages in the blades, openings in the blade surfaces, and an intercommunicating Venturi passage whereby air may be withdrawn at one location on a blade and discharged at another by the centrifugal action of the air.

2. In an aircraft, a lifting airscrew whose blades have openings in their surfaces, a venturi formed in the blade interior and having an inlet in communication with some of said surface openings and having an outlet through which air is discharged, said venturi having an opening at its throat portion in communication with other of said surface openings.

3. In an aircraft, a lifting airscrew having blades provided with openings in their surfaces, each blade having a venturi formed therein and communicating at its inlet with some of said surface openings and having an opening adjacent its throat portion in communication with other of its openings, said venturi having a discharge passage at the outer end of the blade.

EDWARD A. STALKER.